No. 770,561. PATENTED SEPT. 20, 1904.
F. O. CROWLEY.
SWITCH-OFF DEVICE FOR ENDLESS CONVEYERS.
APPLICATION FILED MAR. 12, 1904.
NO MODEL.
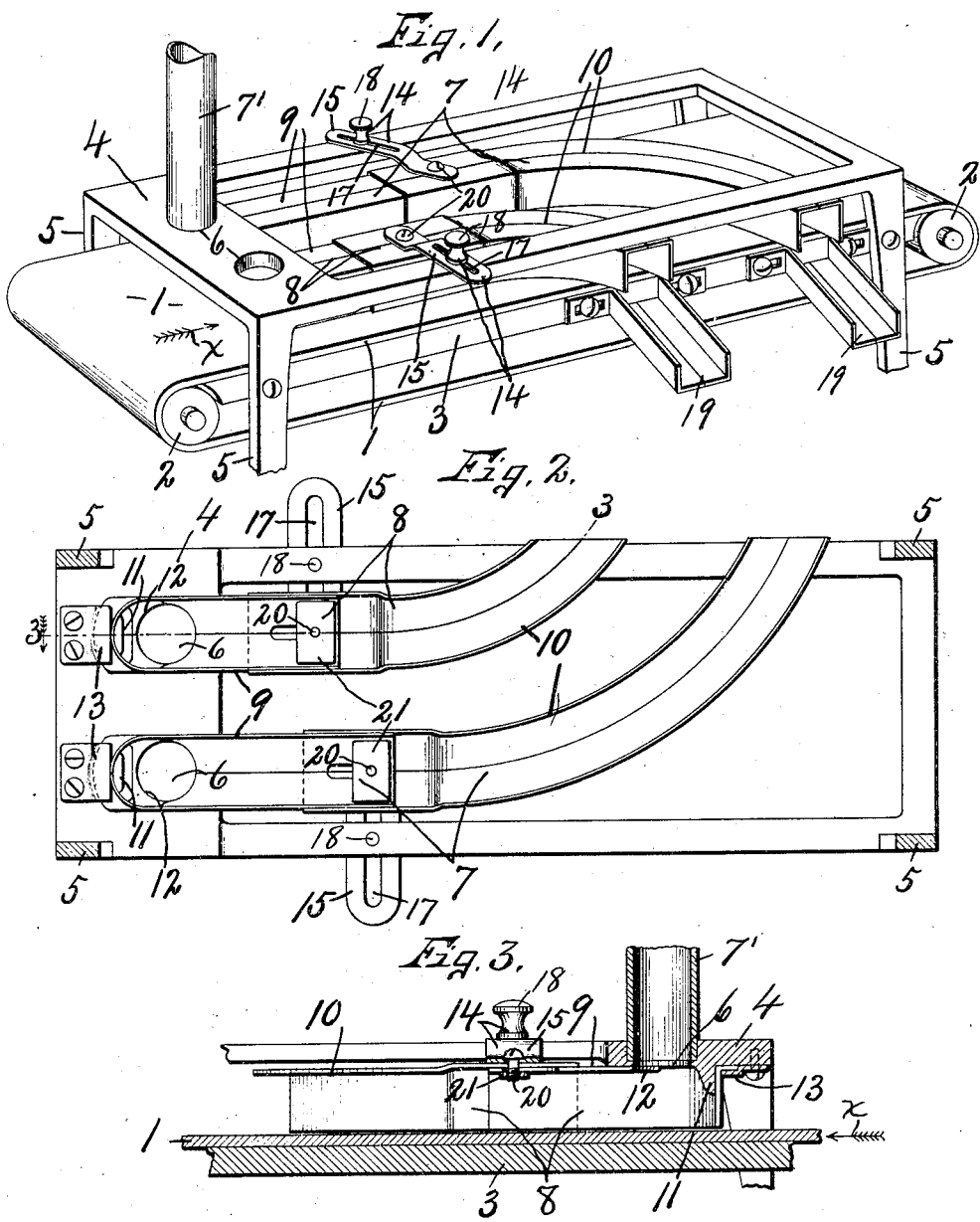
WITNESSES,
B. E. Robinson
H. E. Chase
INVENTOR,
Frederick O. Crowley
BY,
Howard P. Denison
ATTORNEY.

No. 770,561.

Patented September 20, 1904.

UNITED STATES PATENT OFFICE.

FREDERICK O. CROWLEY, OF OSWEGO, NEW YORK.

SWITCH-OFF DEVICE FOR ENDLESS CONVEYERS.

SPECIFICATION forming part of Letters Patent No. 770,561, dated September 20, 1904.

Application filed March 12, 1904. Serial No. 197,778. (No model.)

*To all whom it may concern:*

Be it known that I, FREDERICK O. CROWLEY, of Oswego, in the county of Oswego, in the State of New York, have invented new and useful Improvements in Switch-Off Devices for Endless Conveyers, of which the following, taken in connection with the accompanying drawings, is a full, clear, and exact description.

This invention relates to improvements in switch-off devices for endless conveyers whereby articles of the same kind or different articles may be deposited upon a moving belt or conveyer and carried to any distant point and then switched or shifted laterally at the side of the conveyer and deposited in any suitable chute or receptacle which may be provided for receiving the discharged articles.

The object, therefore, is to provide means coacting with the moving belt or conveyer whereby articles of the same kinds or of different kinds may be fed to the conveyer and automatically discharged at one or more distant points at the side of the conveyer.

Another object is to enable these discharging-points to be varied at the will of the operator by making the switch-off devices adjustable either lengthwise or transversely, or both.

Other objects and uses will appear in the following description.

Figure 1 is a perspective view of an endless conveyer and my improved switch-off mechanism applied thereto. Fig. 2 is an inverted plan of the detached switch-off mechanism seen in Fig. 1, the endless conveyer and its supporting-bed being removed. Fig. 3 is a sectional view taken on line 3 3, Fig. 2, showing one of the switch-off guides and its supporting-frame in combination and a portion of the feeding-belt and its supporting-bed.

Similar reference characters indicate corresponding parts in all the views.

In the drawings I have shown a conveyer as an endless belt 1, which is mounted upon suitable drums or rollers 2 and may be driven from any available source of power. (Not shown.) This conveyer is usually arranged in a horizontal position, and its upper portion rides upon a suitable bed 3 to hold the intermediate portion of the belt from sagging under its own own weight or under the weight of any load which it may be called upon to carry. A suitable table or frame 4 is supported in a horizontal position above the upper part of the conveyer 1 and in this instance is shown as mounted upon the bed 3, which bed may be supported in any desired manner—as, for instance, upon suitable standards or legs 5, to which the bed 3 is secured; but it is to be understood that the table 4 may be supported any distance above the upper surface of the belt 1, depending upon the dimensions of the articles which are to be carried by the conveyer, the only requirements being that sufficient space be left between the table and belt to permit the articles to move freely to their destination. This table is provided with one or more apertures 6, through which the articles are fed by hand or by any mechanical means—as, for instance, through a guide-tube 7', through which the articles may be fed from one of the upper floors of a building or from any other source.

In some manufactories certain work is performed in one department and another class of work on the same articles is done in another department and the products from each department are sent to different parts of the building or to different workmen, in which case the articles for one locality may be fed through either opening 6, so as to be deposited upon the belt 1. Each opening is provided with a separate guide or switch-off device 7 and 8, both of which are supported under the table 4 or may simply rest upon the upper surface of the belt or conveyer and be anchored at one end to the table 4 to hold them from endwise movement by the conveyer. As seen in the drawings, each of these guides or switch-off devices 7 and 8 consist of an inverted trough or conduit leading from its inlet 6 and extending any distance in the direction of movement of the belt (indicated by the arrow $x$) and having its end remote from the inlet 6 deflected laterally at an obtuse angle with the main body and terminating at one side of the conveyer, so that any article fed through the inlet 6 onto the conveyer 1 will be carried forwardly by the conveyer through the guide or switch-off which is alined with the inlet and finally discharged at one side of the conveyer-belt 1. I have shown each of these switch-off devices 7 and 8 as discharging at the same side of the conveyer; but it is obvious that one may discharge at one side and another at the opposite side, either at the same or at different distances from their respective inlets, and it is also apparent that inasmuch as the sides of the guides 7 and 8 constitute the only means for guiding the articles from the inlet to the discharge end the top of said guide might reasonably be open, although in the drawings they are shown as closed for the purpose of preventing the articles from piling one upon the other, as might be the case in the feeding of some classes of articles, particularly at the time when they are being deflected laterally from the direction of movement of the belt by the side walls of the guides. In order to obviate this, the interior surface of the guides is comparatively smooth, so as to avoid serious friction or any liability of clogging of the articles. Each of these guides 7 and 8 is composed of two or more sections 9 and 10, arranged end to end and having their meeting ends telescoping with each other to afford longitudinal adjustment of one upon the other. Each of the sections 9 is hinged at its rear end to a suitable boss 11 on the lower face of the table 4, so as to swing laterally in an arc concentric with its inlet 6, and the upper walls of each section 9 are provided with an inlet 12, which is registered with its inlet 6 in the table 4, and in view of the fact that the sections 9 swing in an arc concentric with the inlet 6 the openings 12 are always registered with their respective openings 6. The sections 9 extend from their respective inlets in the direction of the movement of the belt 1, and the sections 10 telescope with the forward free ends of the sections 9 and are free to move laterally with the sections 9 when the latter are swung upon their axes and are also free to slide lengthwise upon the free ends of the section 9 to vary the points of discharge. The free ends of the sections 10 are deflected laterally at obtuse angles with their respective sections 9, and it is now apparent that the guides of the switch-off devices 7 and 8 may be made to discharge at different distances from their respective inlets 6 either by rocking the guides laterally on their axes or by moving the section 10 lengthwise of the belt with reference to the section 9. The sections 9 are held from endwise movement by the boss or projection 11, and a suitable clamp 13 and the sections 10 are held from endwise movement by suitable clamping devices 14, the latter clamping devices being constructed and connected in such manner as to permit the section 10 to move laterally or endwise. The clamping device 14 consists of a plate 15, provided with a lengthwise slot 17, in which is inserted a clamping-screw 18, engaged with a threaded aperture in the table 4. It is now apparent that by simply loosening the screw 18 the plates 15 may be moved endwise to rock the sections 9 and 10 laterally, or the section 10 may be moved endwise for the purpose of changing the position of the discharge with reference to the inlet, after which the screw 18 may be retightened to hold the parts 9 and 10 in their adjusted position.

At the discharge end of the guides or switch-off devices 7 and 8 are chutes 19, which are secured to the bed 3 to receive the articles discharged from the open ends of the sections 10; but it is evident that these chutes may be dispensed with and a movable receptacle of any construction may be substituted therefor. The sections 9 and 10 are preferably held so as not to bear upon the belt or conveyer 1 and are usually split lengthwise to permit lateral adjustment of the sides, and thereby vary the width of the channel in the switch-off devices 7 and 8 for different-sized articles. The longitudinal sections of each of the parts 9 and 10 of each switch-off device are held in their adjusted position by a screw 20 and clamping-plate 21, the overlapping meeting edges of the upper walls of the sections 9 and 10 being clamped between the parts 15 and 21 by the screw 20.

The operation of my invention may now be readily understood upon reference to the foregoing description and the accompanying drawings, and it will be observed that I do not limit myself to any particular use or to the precise construction shown and described.

Having thus described my invention, what I claim, and desire to secure by Letters Patent, is—

1. In combination with an endless conveyer, a guide or switch-off device upon or in close proximity to the conveyer and having an inlet in one end for receiving the articles to be fed and its other end deflected laterally to the sides of the conveyer whereby the articles are fed by the belt from the inlet and diverted from the belt by the guide.

2. The combination with an endless belt conveyer, a table having an inlet through which the articles are fed upon the conveyer and means extending from said inlet in the direction of movement of the belt for deflecting the course of the articles laterally from the conveyer.

3. The combination with a moving endless conveyer, having an extensible switch-off device extending in the direction of movement of the belt and having its advance end deflected laterally to one side of the belt, the extension being for the purpose of changing the position of the discharge end with reference to the rear end of the switch-off device.

4. The combination with a movable endless belt or conveyer, a switch-off guide extending in the direction of movement of the belt and having an inlet in its rear end for permitting the insertion of the articles to be fed onto the belt, the advance end of said guide being deflected laterally to the side edge of the belt.

5. The combination with a movable endless belt or conveyer, a switch-off guide extending in the direction of movement of the belt and having an inlet in its rear end for permitting the insertion of the articles to be fed onto the belt, the advance end of said guide being deflected laterally to the side edge of the belt, said advance end being adjustable lengthwise of the belt to vary the distance of the discharge from the inlet.

6. The combination with a movable endless belt or conveyer, a switch-off guide extending in the direction of movement of the belt and having an inlet in its rear end for permitting the insertion of the articles to be fed onto the belt, the advance end of said guide being deflected laterally to the side edge of the belt, said advance end being movable laterally or transversely of the belt to vary the distance of the point of discharge with reference to the inlet.

7. The combination with a movable endless belt or conveyer, a switch-off guide extending in the direction of movement of the belt and having an inlet in its rear end for permitting the insertion of the articles to be fed onto the belt, the advance end of said guide being deflected laterally to the side edge of the belt, said advance end being adjustable lengthwise of the belt to vary the distance of the discharge from the inlet, and means for clamping the guide in its adjusted position.

8. The combination with a movable endless belt or conveyer, a switch-off guide extending in the direction of movement of the belt and having an inlet in its rear end for permitting the insertion of the articles to be fed onto the belt, the advance end of said guide being deflected laterally to the side edge of the belt, said advance end being movable laterally or transversely of the belt to vary the distance of the point of discharge with reference to the inlet, and means for clamping the guide in its adjusted position.

9. The combination with an endless conveyer, of a switch-off guide having sides adjustable toward and from each other, and means to hold the guide in proximity to the conveyer.

10. The combination with an endless conveyer of a laterally-movable switch-off guide supported in proximity to the conveyer and provided with sides adjustable toward and from each other and means to support the guide.

In witness whereof I have hereunto set my hand this 17th day of February, 1904.

FREDERICK O. CROWLEY.

Witnesses:
PETER BARBEAU,
P. O'DONNELL.